United States Patent
Onishi et al.

[11] Patent Number: 5,475,560
[45] Date of Patent: Dec. 12, 1995

[54] CURRENT LIMITING DEVICE WITH A SUPERCONDUCTOR AND A CONTROL COIL

[75] Inventors: Toshitada Onishi, Tsukuba; Michiharu Ichikawa, Urayasu; Hiroyuki Kado, Kamakura; Yasuo Watanabe, Kawasaki, all of Japan

[73] Assignees: Kogyo Gijutsuin; Denryoku Chuo Kenkyusho, both of Tokyo, Japan

[21] Appl. No.: 891,227

[22] Filed: May 29, 1992

[30] Foreign Application Priority Data

Jun. 3, 1991 [JP] Japan ................... 3-157450

[51] Int. Cl.⁶ .................................. H02H 3/08
[52] U.S. Cl. ................ 361/141; 361/19; 361/58
[58] Field of Search ................ 361/19, 141, 58; 307/104, 245, 306, 307; 505/851, 856, 857, 860, 867, 868, 869, 870, 884, 885, 886, 887; 174/125.1; 338/325; 335/216; 323/360; 336/DIG. 1; 327/527, 528, 366

[56] References Cited

U.S. PATENT DOCUMENTS

| | | | |
|---|---|---|---|
| 2,946,030 | 7/1960 | Slade | 335/216 X |
| 3,091,702 | 5/1963 | Slade | 505/860 X |
| 3,283,168 | 11/1966 | Garwin | 307/245 |
| 3,691,491 | 9/1972 | Massar et al. | 335/216 X |
| 4,470,090 | 9/1984 | Carr, Jr. | 361/19 |
| 4,602,231 | 7/1986 | Purcell et al. | 335/216 |
| 4,974,113 | 11/1990 | Gabrielse et al. | 361/141 |
| 5,105,098 | 4/1992 | Gattozzi | 307/245 |
| 5,148,046 | 9/1992 | Hilal | 307/245 |
| 5,225,957 | 7/1993 | Tsurunaga | 361/19 |
| 5,355,275 | 10/1994 | Goodier et al. | 361/141 |

FOREIGN PATENT DOCUMENTS 00-81620  3/1989  Japan ................... 361/19

Primary Examiner—A. D. Pellinen
Assistant Examiner—Fritz M. Fleming
Attorney, Agent, or Firm—Emmanuel J. Lobato

[57] ABSTRACT

A current limiting device using a superconductor limits a current flowing through a current limiting coil, which mangetically couples to the superconductor. A control coil is provided to magnetically couple with the current limiting coil when the superconductor is switched to a normal conduction state. A variable control impedance is connected to the control coil to adjust a control current flowing through the control coil. The current limiting impedance value of the current limiting coil is adjusted by the value of the control impedance to obtain an adjustable value of the current flowing through the current limiting coil.

3 Claims, 2 Drawing Sheets

CURRENT LIMITING DEVICE WITH A SUPERCONDUCTOR AND A CONTROL COIL

BACKGROUND OF THE INVENTION

The present invention relates to a current limiting device utilizing a magnetic flux shielding characteristic of a superconductor and, more particularly, to an improvement of its current limiting performance.

If a current by, for example, short-circuiting in a power transmission and distribution system can be limited quickly, then it is possible to reduce the overcurrent margin of a transformer or the like connected to the system. This is advantageous in terms of design as well as economization. This also limits the flow of overcurrent to a short-circuiting portion on the consumer side to a fixed value or below, making it possible to suppress the spread of the trouble to the minimum and at the same time to prevent the trouble from affecting the power transmission and distribution system.

To this end, power transmission system utilizes means for minimizing damage from such a trouble by quickly cutting off the short-circuit current through use of a breaker, for example. Since the short-circuit current increases with an increase in the system capacity, however, the capacity of the breaker must also be increased accordingly.

It is technically difficult, however, to make the breaking current of the breaker to be greater than a value available at present. On this account, it is almost impossible to increase the present system capacity, making it difficult to meet growing demands.

In view of the above, some of the inventors of the subject application have proposed a current limiting device using a superconductor as a means whereby the breaking current is reduced rather than increased for increasing the system capacity.

Since the current value to be limited by such a current limiting device is a fixed value which depends on the superconductor used and the number of turns of the current limiting coil, however, there has been left unsolved a problem that it is necessary to fabricate a current limiting device which provides a required limited current value in accordance with the capacity of the system in which the current limiting device is used.

SUMMARY OF THE INVENTION

It is therefore an object of the present invention to provide a current limiting device using a superconductor which permits easy adjustment of the current limiting reactance value as required and allows ease in its design, manufacture and use.

The present invention is characterized in that a control coil having connected thereto a control impedance, which is magnetically coupled to the current limiting coil when the afore-mentioned superconductor loses the magnetic flux rejecting function, is provided in a conventional current limiting device, i.e. in the current limiting device using a superconductor in which magnetic flux caused by a current applied to the current limiting coil is used to control the magnetic flux shielding characteristic of the superconductor to limit the current based on the reactance in the current limiting coil.

With the above arrangement, when the magnetic flux emanating from the current limiting coil has exceeded the critical magnetic flux density of the superconductor and the superconductor has lost its flux shielding function, a voltage is induced in the control coil and a current is applied to the control impedance. By controlling a current to the control impedance, it is possible to control the reactance value of the current limiting coil when the superconductor loses its flux rejection function. Hence the afore-noted problems in design and manufacture can be solved. Next, an embodiment of the present invention will be described.

BRIEF DESCRIPTION OF THE DRAWINGS

The present invention will be described in detail below in comparison with prior art with reference to accompanying drawings, in which.

DETAILED DESCRIPTION

To make differences between prior art and the present invention clear, an example of the prior art will first be described.

Figure 3:
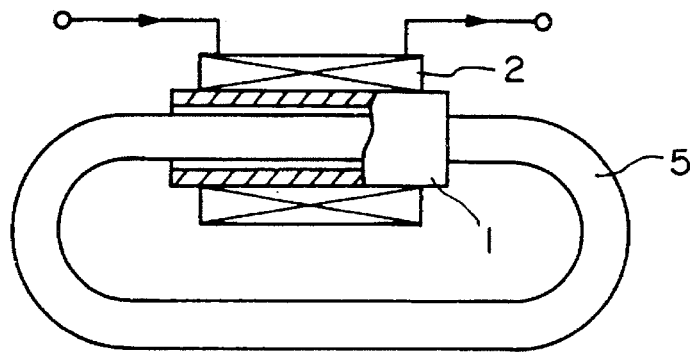
FIG. 3 is a diagram explanatory of a conventional current limiting device using superconductor.

A conventional device has such a construction as shown in FIG. 3, in which a current limiting coil (2) is wound around a tubular superconductor (1) coaxially therewith and a magnetic ring member (5) which magnetically couples with the current limiting coil (2) is extended through the tubular superconductor (1). In the superconductive state of the superconductor (1) a current to be limited is applied to the coil (2) to cause it to perform a current limiting action on the principle described below.

In the state in which a current below the critical current value of the superconductor (1) is being applied to the current limiting coil (2), the current applied thereto sets up magnetic fluxes, but the superconductor (1) wrapped by the current limiting coil (2) is in the superconductive state and has a property of shielding the magnetic flux. Consequently, the magnetic fluxes emanating from the current limiting coil (2) cannot enter into the tubular superconductor (1). Thus the magnetic flux density B is zero, in which case the reactance of the current limiting coil (2) is remarkably small.

In a case where the magnetic field generated by the current limiting coil (2) is in excess of the critical magnetic field of the superconductor (1), that is, where the value of surface current provided for the superconductor (1) to shield the magnetic flux exceeds the critical current value of the superconductor (1), the superconductor (1) can no longer remain in the superconductive state and is abruptly switched to the normal conductive state by a flux jumping phenomenon caused therein, and as a result, the superconductor (1) loses the flux shielding function. Consequently, the magnetic flux emanating from the coil (2) enters into the tubular superconductor (1) and the magnetic flux density B becomes $B_n$, with the result that the reactance of the current limiting coil (2) rapidly becomes considerably larger than the reactance in the state in which the magnetic flux is shielded, that is, in the case where the value of current through the coil (2) is smaller than the critical current value of the superconductor (1).

Figure 4:
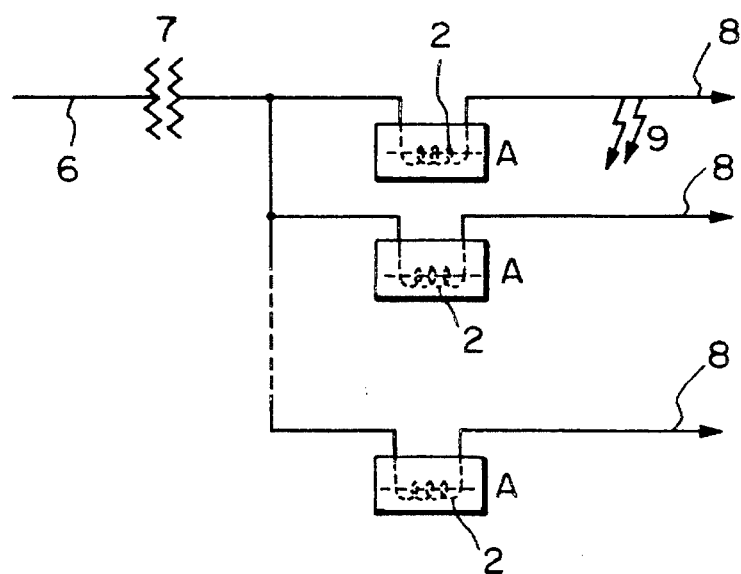
FIG. 4 is a diagram showing an example of the actual use of the current limiting device using a superconductor.

Hence, with such an arrangement as shown in FIG. 4 in which the current limiting coil (2) of a current limiting device A is connected to each consumer circuit (8) connected via a transformer (7) to a power transmission and distribution system (6), even if a short-circuit (9) occurs in the consumer circuit, an excess current flowing from the transmission and distribution system (6) to the faulty spot is limited, making it possible to check the spread of the trouble and prevent damage to the transformer. In addition, according to this principle, the current value to be limited by the coil can be increased by increasing its current capacity, and hence is not limited by the breaking capacity as in the afore-mentioned case of breaking the short-circuit current by the breaker. This allows ease in dealing with an increase in the system capacity and well satisfies the growing demands.

Since the current value to be limited by the current limiting device is a fixed value which depends on the superconductor used and the number of turns of the current limiting coil, however, there has been left unsolved a problem that it is necessary to fabricate a current limiting device which provides a required limited current value in accordance with the capacity of the system in which the current limiting device is used. The present invention will now be described.

Figure 1:
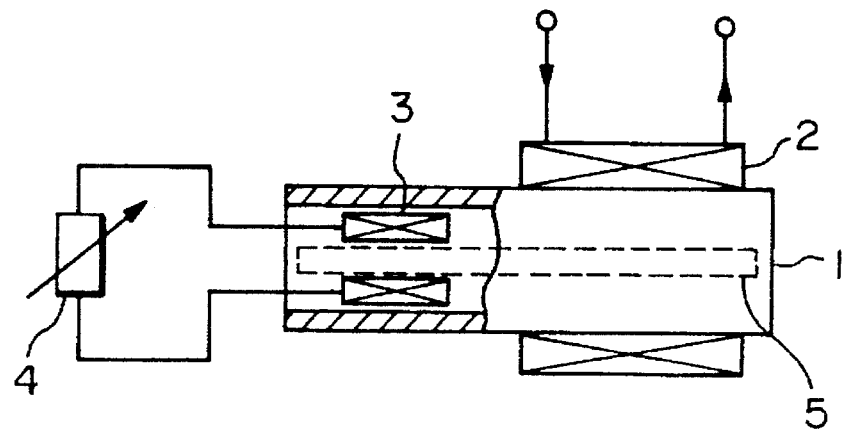
FIG. 1 is a diagram explanatory of an embodiment of the present invention.

FIG. 1 is a schematic diagram, partly in section, illustrating an embodiment of the present invention, in which a control coil (3) is coaxially mounted in the tubular superconductor (1) with the current limiting coil (2) coaxially wound thereon and a control impedance (4) is connected to the coil (3). By controlling the value of the control impedance (4), a desired current limiting reactance value, i.e. a desired limited current value is obtained.

The superconductor 1 shields in its superconductive state magnetic flexes generated from the current limiting coil 2, through which a control current flows from a current source (as shown by elements 6 and 7 of FIG. 4). Accordingly, in case of the superconductive state of the superconductor 1, the current limiting coil 2 and the control coil 3 are not coupled magnetically to each other so that the control impedance 4 connected in series to the control coil 3 has no effect on the current limiting coil 2. However, the superconductor 1 can maintain its superconductive state only in a case where a current flowing through the current limiting coil 2 is less than a fixed value. In other words, when a current (to be limited) exceeding the fixed value flows in the current limiting void 2, the superconductor 1 is switched from its superconductive state to the normal conductive state.

As a result of the above operation, the magnetic fluxes generated from the current limiting coil 2 are not shielded but magnetically coupled to the control coil through the magnetic member 5. In this case, a state is now maintained where the control impedance 4 connected in series to the control coil 3 is equivalently connected to the current limiting coil 2. Accordingly, a current flowing through the current limiting coil 2 is limited by the control impedance 4 and also adjusted by adjusting the value of the control impedance 4.

In the above embodiment, by providing a rod-like magnetic member (5) or ring-shaped magnetic member (5) (rod-shaped in the drawing) astride the control coil (3) inside the tubular superconductor (1) as indicated by the broken lines in FIG. 1, the magnetic coupling between the coil (2) and (3) becomes easier than in the case where they are hollow. This allows ease in controlling the current limiting reactance by the control impedance (4).

Figure 2:
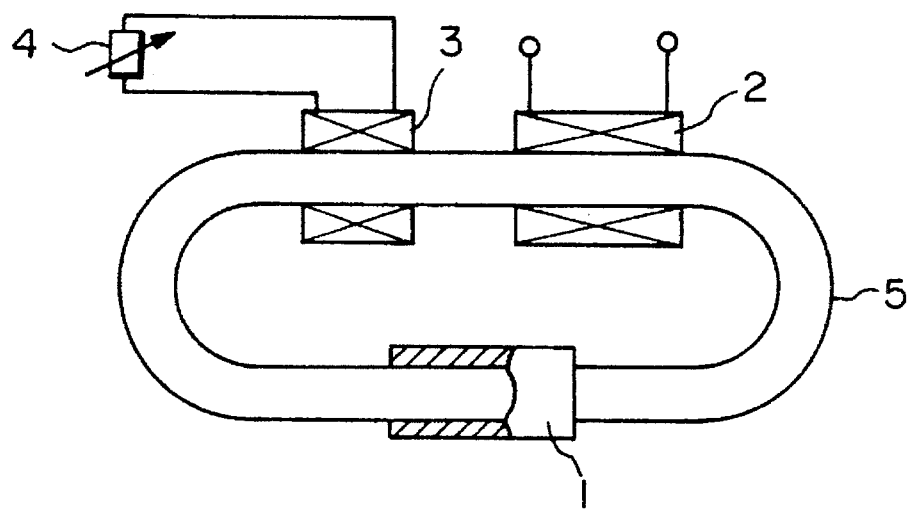
FIG. 2 is a diagram explanatory of another embodiment of the present invention.

Moreover, the control coil (3) need not always be disposed in the superconductor (1) but may also be mounted on the magnetic member (5) outside the superconductor (1) as shown in FIG. 2. Furthermore, the superconductor (1), the current limiting coil (2) and the control coil (3) may also be provided separately on the magnetic member (5) so that heat generated by the current limiting coil (2) does not affect cooling of the superconductor (1).

As described above, the present invention permits easy control of the current limiting reactance value in the current limiting device using a superconductor since the magnetic flux caused by the current flow through the current limiting coil is used to control the flux shielding effect of the superconductor and the invention offers therefore advantages in the design, manufacture and use of the device.

What we claim is

1. A current limiting device using a superconductor, comprising:

a superconductor;

a currrent source;

a current limiting coil disposed to magnetically couple to the superconductor to flow from said current source a current to be limited by said current device;

a control coil disposed in the current limiting device to magnetically couple to the current limiting coil thereby limiting the current to be limited to an adjusted value by controlling a magnetic flux caused by a control current flowing through said control coil when the superconductor is switched to a normal condition state then the superconduction condition of the superconductor is lost in response to the current from said current source through said current limiting coil exceeding said adjusted value; and a variable control impedance connected to the control void to variably adjust the control current to obtain the adjusted value of the current to be limited.

2. A current limiting device causing a superconductor according to claim 1, in which said control coil is disposed in and coaxially with the superconductor.

3. A current limiting device using a superconductor according to claim 1, in which a magnetic ring is provided so that the superconductor, the current limiting coil and the control coil are separately disposed on the magnetic ring.

* * * * *